United States Patent [19]

Stöhr

[11] Patent Number: 4,700,517

[45] Date of Patent: Oct. 20, 1987

[54] CABIN-LIKE COVER

[75] Inventor: Albert Stöhr, am Wiegenberg, Fed. Rep. of Germany

[73] Assignee: Gebr. Hennig GmbH, Fed. Rep. of Germany

[21] Appl. No.: 931,673

[22] Filed: Nov. 17, 1986

Related U.S. Application Data

[63] Continuation of Ser. No. 805,966, Dec. 5, 1985, abandoned.

[30] Foreign Application Priority Data

Dec. 18, 1984 [DE] Fed. Rep. of Germany ....... 3446036
Apr. 22, 1985 [DE] Fed. Rep. of Germany ... 8511949[U]

[51] Int. Cl.⁴ .............................................. E04H 1/00
[52] U.S. Cl. ....................................... 52/241; 52/471; 52/97; 52/126.4
[58] Field of Search ...................... 52/241, 242, 238.1, 52/79.9, 274, 471, 97, 299, 126.3, 126.4, 79.1, 285

[56] References Cited

U.S. PATENT DOCUMENTS

| | | | |
|---|---|---|---|
| 2,394,443 | 2/1946 | Guignon, Jr. | 52/471 X |
| 3,189,135 | 6/1965 | Slowinski | 52/241 |
| 3,228,160 | 1/1966 | O'Brian | 52/242 |
| 3,420,023 | 1/1969 | Gregori | 52/241 X |
| 3,432,196 | 3/1969 | Marchiorello | 52/285 |
| 3,720,026 | 3/1973 | Gasteiger | 52/241 |
| 3,783,174 | 1/1974 | Lindgren | 52/471 X |
| 3,830,027 | 8/1974 | Paisley et al. | 52/241 X |
| 4,287,691 | 9/1981 | Guenther | 52/97 |
| 4,287,695 | 9/1981 | Höfler | 52/241 |

FOREIGN PATENT DOCUMENTS 1253372 1/1961 France ............................. 52/238.1

Primary Examiner—Carl D. Friedman
Attorney, Agent, or Firm—Thomas & Kennedy

[57] ABSTRACT

The invention relates to a cabin-like cover, in particular for covering machines, in which the panels of the side walls have a U-shaped cross-section which is open towards the bottom and engages over a base frame so that the junction of the panels in the base frame is well protected against the entry of fluid and foreign bodies. In at least one side wall of the cabin-like cover a closure element is also provided and after it has been detached the individual panels of the side wall can be removed and thus later alterations to the side walls can be carried out without complete dismantling of the cabin-like cover.

10 Claims, 8 Drawing Figures

U.S. Patent Oct. 20, 1987 4,700,517
FIG. 1
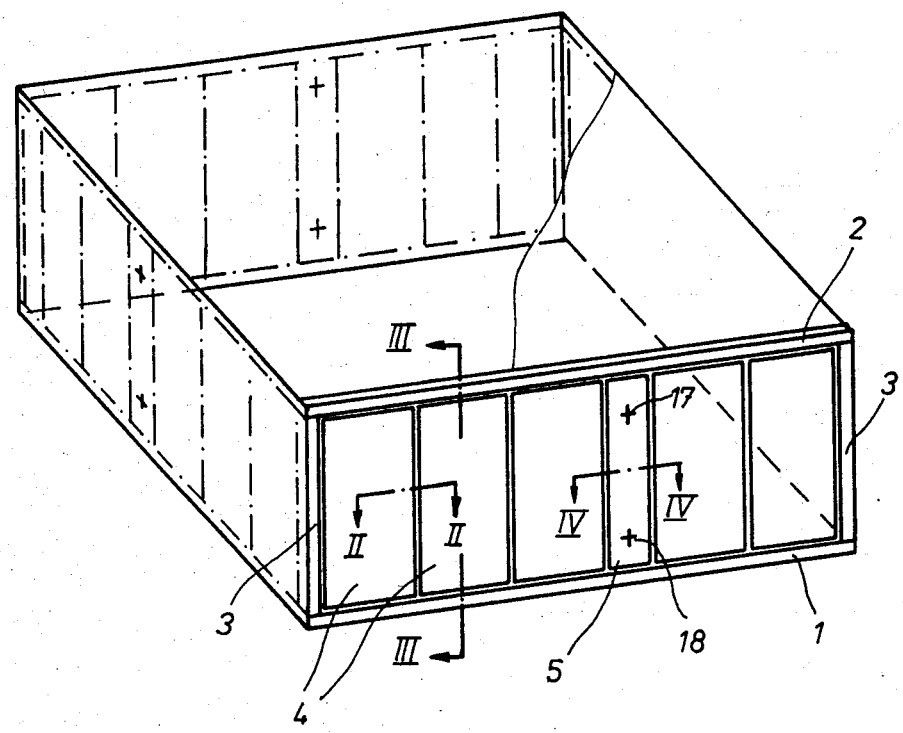
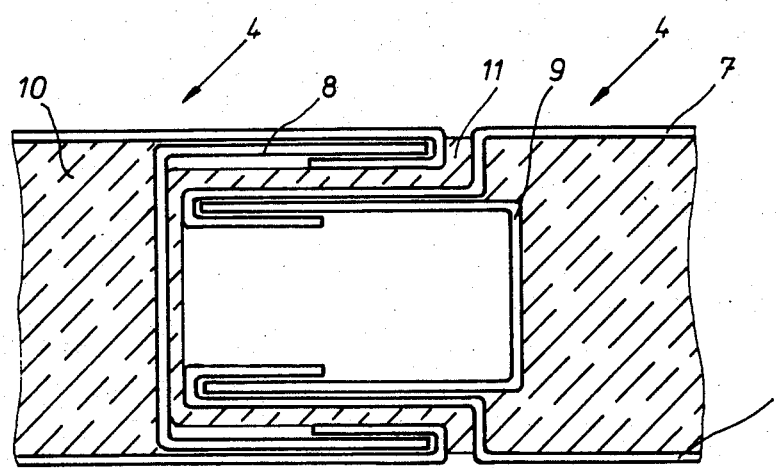
FIG. 2

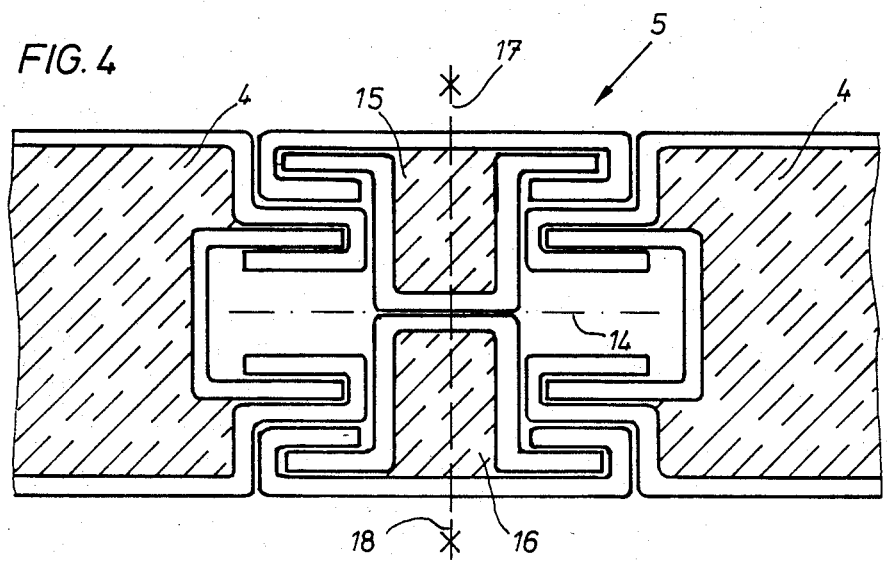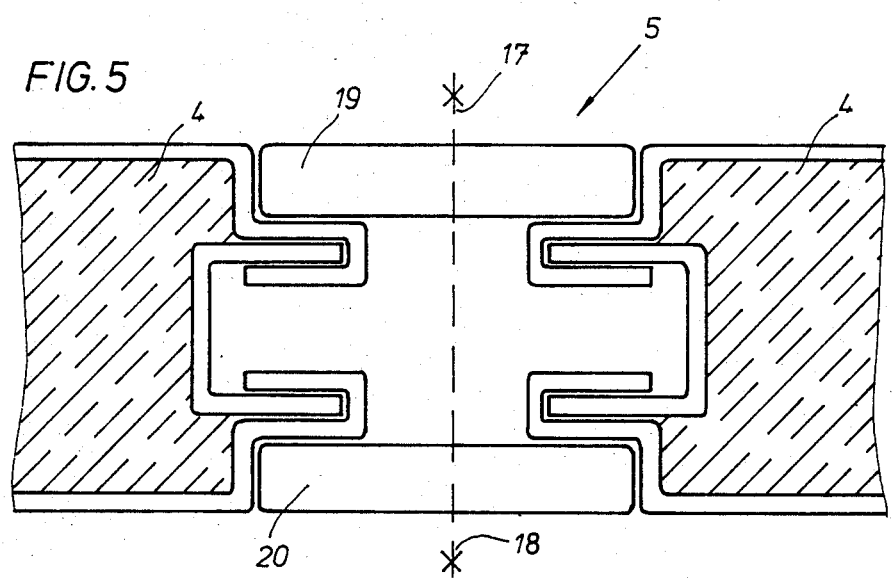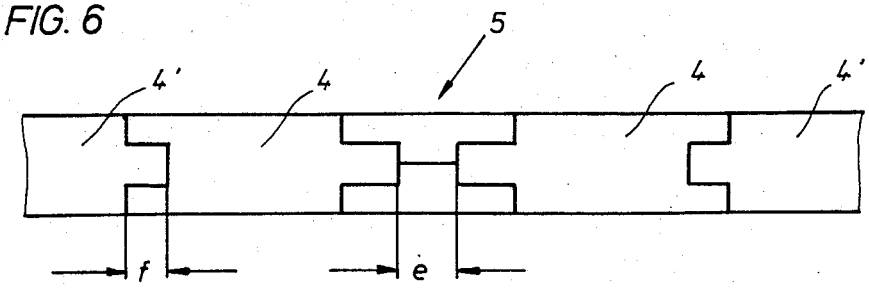

CABIN-LIKE COVER

This is a continuation of co-pending application Ser. No. 805,966 filed on Dec. 5, 1985, now abandoned.

FIELD OF THE INVENTION

The invention relates to a cabin-like cover which is particularly suitable for covering machine tools, but also for many other industrial purposes.

BACKGROUND OF THE INVENTION

Cabin-like covers are known in which the supporting framework is formed by a plurality of horizontal and vertical beams which are screwed or welded together and on which cover plates are placed. The essential disadvantage of these constructions lies in the comparatively high expenditure on assembly. It is a further disadvantage that maintenance and repair work in the cabin-like cover (for example replacement of large assemblies) generally requires substantial dismantling of the cover.

A known cabin-like cover in which the panels forming the side walls of the cover are constructed so as to be self-supporting represents a significant improvement over this prior art. In such a construction the arrangement of a base frame and a top frame is sufficient in order for the side walls of the cover to be kept free of troublesome intermediate members.

In this way not only is the assembly of the cabin-like cover considerably simplified, but in case of need (particularly for maintenance and remodelling purposes) free openings which extend over the total height of the cover can be created by removing individual panels. In the last-mentioned known construction the base frame has a U-shaped cross-section which is open towards the top and into which the panels are inserted from above. The gaps between the panels and the base frame must be sealed on the interior and the exterior of the cabin-like cover against the entry of fluid and/or foreign bodies. Furthermore, in the known construction the baffles which are in many cases required on the inside of the cover (to deflect cooling agent or shavings) must—in order to have a sufficiently steep inclination—be mounted on the panels which, however, do not generally have sufficiently thick walls for such mounting. At the same time such mounting of the baffles on the panels creates problems of sealing.

A further disadvantage of the previously known cabin-like covers is that detachment of individual panels requires a more or less complete dismantling of the whole cover. Consequently in the known construction it is not generally possible for later alterations in the side walls to be carried out in a simple manner, for example altering the position of a window or a door or producing a larger opening in a side wall in a short time for assembly purposes.

SUMMARY OF THE INVENTION

The object of the invention, therefore, is to construct a cabin-like cover in such a way that the junction of the panels with the base frame is well protected in a structurally simple manner against the entry of fluid and foreign bodies and that it is also possible for baffles to be mounted on the inside of the cabin-like cover so as to be mechanically stable and satisfactorily sealed at the mounting point.

In a further embodiment of the invention a cabin-like cover is constructed in such a way that later alterations in the construction of the side walls can be carried out in a particularly simple manner, particularly without dismantling the whole cover.

BRIEF DESCRIPTION OF THE DRAWINGS

Some embodiments of the invention are illustrated in the drawings, in which:

FIG. 1 shows a schematic representation of a cabin-like cover according to the invention, FIG. 2 shows a horizontal section (along the line II—II in FIG. 1) through two panels which interengage with their side edges, FIG. 4 shows a horizontal section (along the line IV—IV in FIG. 1) through a closure element, FIG. 5 shows a section (similar to FIG. 4) through a further embodiment of a closure element, FIG. 6 shows a horizontal section through some panels and a closure element arranged between them.

DETAILED DESCRIPTION

Figure 3:
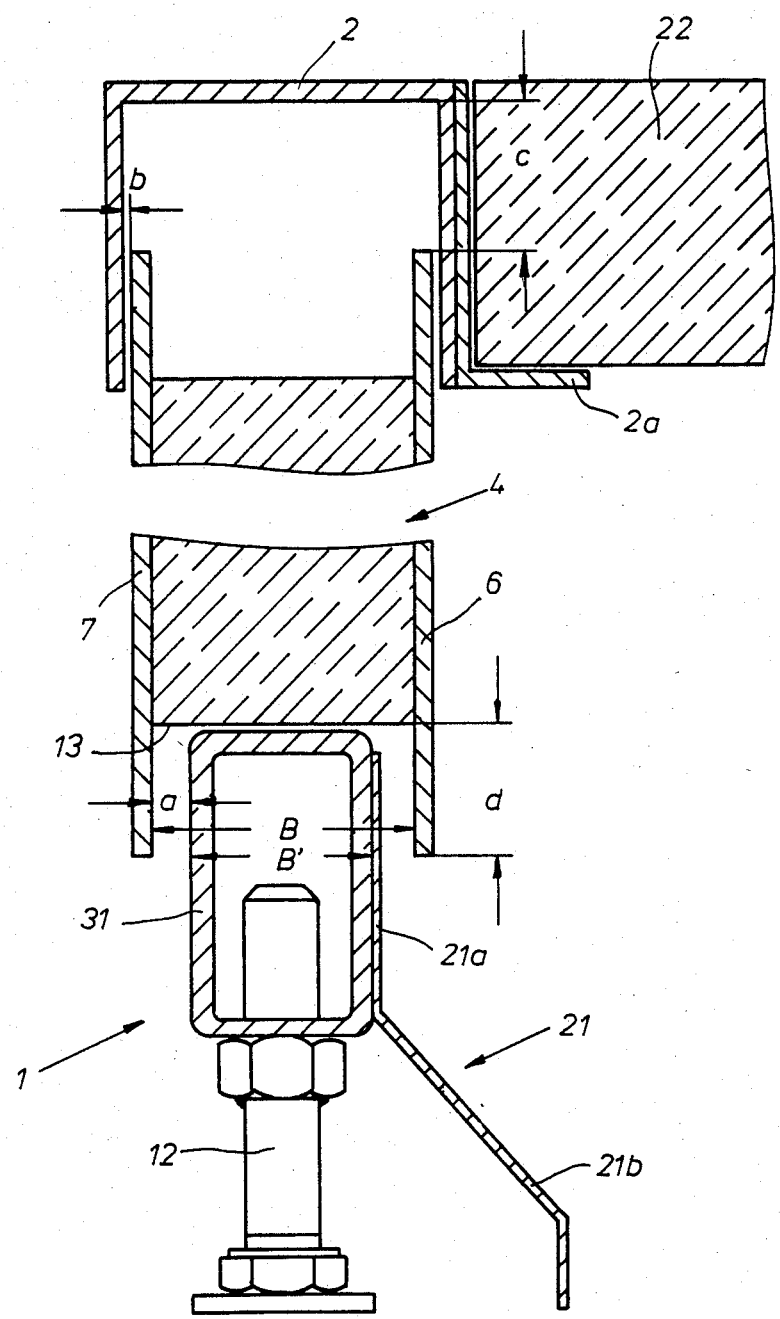
FIG. 3 shows a vertical section along the line III—III in FIG. 1.

The cabin-like cover illustrated quite schematically in FIG. 1 is intended for example for covering a machine tool (and possibly also serves as a sound-insulation cabin), and contains a base frame 1, a top frame 2, corner pieces 3, panels 4 and a closure element 5 in the region of each side wall.

One embodiment of the panels 4 forming the side walls is illustrated in FIG. 2. The panels have an outer coating 6 and 7 made for example from sheet metal on the two broad sides and 8 and 9 on the end edges. The outer coating of the panels encloses an insulating material 10.

The end edges of the panels 4 are constructed so as to be complementary to each other. As can be seen from FIG. 2, one end edge (of the left-hand panel 4) has a U-shaped cross-section, whilst the end edge of the other (right-hand) panel has a plug-like cross-section. A sealing element 11 is arranged between the two panels which interlock with their complementary end edges.

The base frame of the embodiment illustrated in FIG. 3 contains one single beam 31 of box-shaped cross-section which is supported on the ground by supports 12 which are adjustable in height and constructed as adjusting screws. The lower edge 13 of the panels 4 which is constructed with a U-shaped cross-section engages over the beam 31 of the base frame 1. The internal breadth B of the U-shaped cross-section of the lower panel edge is at least as great as the outer breadth B' of the base frame beam 31.

In the illustrated embodiment there is a clear distance a between the outer coatings 6 and 7 of the panels 4 and the beam 31 of the base frame 1.

The top frame 2 has a U-shaped cross-section which is open towards the bottom and engages over the panels 4. There is also a certain clearance b provided between the outer coatings 6, 7 of the panels 4 and the side walls of the top frame 2.

The upper edges of the panels 4 have a spacing c relative to the top frame 2 which is greater than the dimension d by which the panels 4 engage over the beam 31 of the base frame 1. Consequently the panels 4 can be raised relative to the top frame 2 to such an extent that the lower edge of the panels 4 is freed from the base frame 1. The clearance b between the panels 4 and the side walls of the top frame 2 also facilitates tilting of the panels 4 within the top frame 2 so that the raised and tilted panels 4 can be detached from the top frame 2 and from the base frame 1 by pulling them out at an angle downwards.

A baffle 21 which serves to deflect cooling agent and shavings is provided on the inner face of the base frame beam 31, and the U-shaped cross-section of the lower edge of the panels 4 engages over the upper part 21a of the baffle whilst the lower part 21b thereof projects into the interior of the cabin-like cover.

An attachment 2a which serves to support top elements 22 is also provided on the inside of the top frame 2.

FIG. 4 shows an embodiment of a closure element 5 which is preferably provided in each side wall of the cabin-like cover. This closure element 5 has a U-shaped cross-section in the region of both side edges and is divided in the vertical longitudinal central plane 14. Thus the closure element 5 consists of two parts 15 and 16 which are releasably connected to each other by connecting elements 17, 18 (for example screws).

The two panels 4 adjacent to the closure element 5 have a plug-like cross-section on their side edges facing the closure element 5. The closure element 5 closes off these two panels 4 flush with the broad sides.

In the embodiment illustrated in FIG. 4 the two parts 15, 16 of the closure element 5 also have an outer coating (for example made from sheet metal) and an insulating material arranged in between. In vertical section the closure element 5 can be constructed in the same way as the panels 4 (cf. FIG. 3). After the connecting elements 17 and 18 have been released the part 16 of the closure element 5 located on the outside of the cabin-like cover can then be removed towards the exterior; for this purpose it is raised slightly and tilted somewhat and can then be detached from the base frame 1 and from the top frame 2. The other part 15 of the closure element 5 can then also be removed without difficulty either towards the interior or the exterior.

If the closure element 5 is removed in this way then—as can be seen from FIG. 6—one of the two panels 4 adjacent to the closure element 5 can be moved in the longitudinal direction of the side wall of the cabin-like cover to the extent that the engagement between the side edges of this panel 4 and the next panel 4' is released. For this purpose the core dimension e (FIG. 6) of the closure element 5 must be somewhat greater than the dimension f with which the side edges of adjacent panels 4, 4' engage in one another.

If after the closure element 5 has been released and the adjacent panel 4 has been moved the engagement of this panel 4 with the next panel 4' is released in this way, then the panel 4 can be removed from the base frame 1 and the top frame 2 in the manner already explained in FIG. 3 by raising and tilting. In this way all the required panels of the side walls can be removed one after the other without the basic structure of the cabin-like cover, particularly the base frame 1, the top frame 2 and the corner pieces 3, having to be dismantled.

Thus in this way all later alterations in the side walls of the cabin-like cover can be very simply and quickly carried out: windows and doors can be inserted and changed in position. In addition a larger opening can be created for assembly purposes by removing some panels.

In the further embodiment which is schematically illustrated in FIG. 5 the closure element 5 consists of two flat plates 19, 20 which are connected to each other by the releasable connecting elements 17 and 18. Thus in this simplified embodiment no insulation is provided in the region of the closure element 5. However, apart from this the closure element has the same advantages as have already been explained above for the variant according to FIG. 4.

Figure 7:
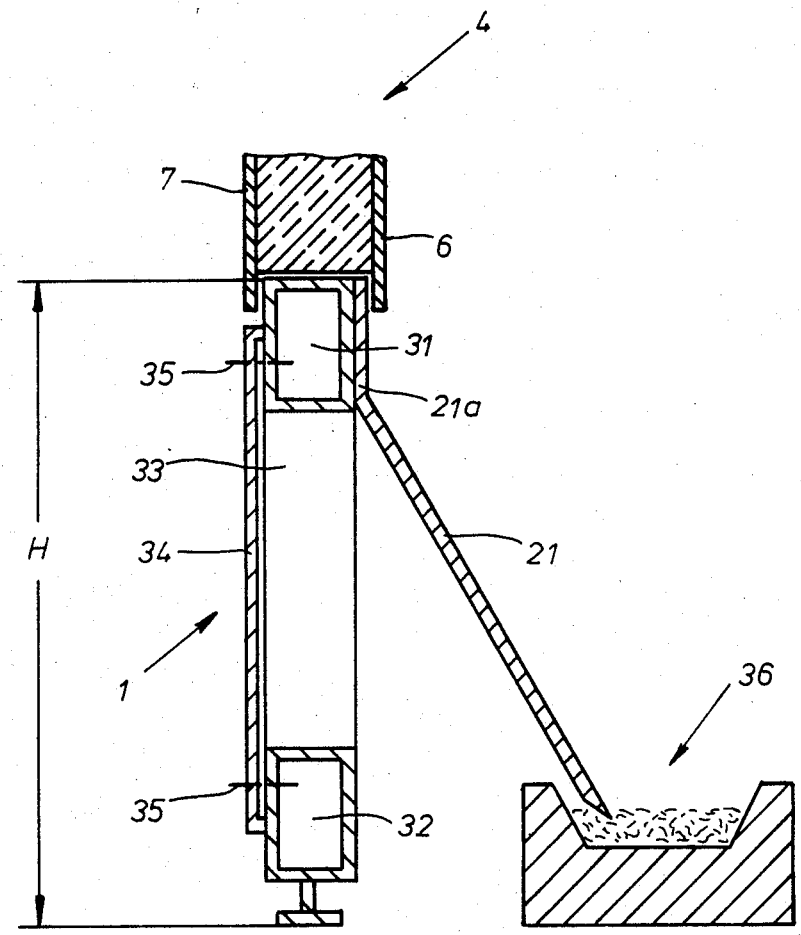
FIG. 7 shows a vertical section through a variant of the base frame.

FIG. 7 shows a second embodiment of the base frame 1 of of the cabin-like cover according to the invention. This base frame 1 contains an upper beam 31 of box-shaped cross-section and a further beam 32 which is parallel to the upper beam 31 and spaced from it and supported on the ground. The U-shaped cross-section of the lower edge of the panels 4 engages over the upper beam 31 in the manner already explained with the aid of FIG. 3.

The beams 31 and 32 are connected to each other at certain intervals by vertical connecting elements 33. The free space between the two beams 31, 32 is covered towards the exterior by removable cover elements 34 which are connected to the beams 31, 32 for example by screws 35.

A part 21a of a baffle 21 which delivers shavings which land on it to a shavings conveyor 36 arranged in the interior of the cabin-like cover is also mounted on the upper beam 31.

By the use of two beams 31, 32 with the clear space between them covered towards the exterior by coating elements 34, it is possible in spite of the light construction which saves on material for the base frame 1 to have a sufficiently great height H (for example 1000 mm) for the baffle 21 mounted on the beam 31 to have the desired steep inclination. The mounting of the baffle 21 on the beam 31 does not create any problems. It is advantageous that the outer coating 6 of the panel 4 partially engages over the upper part 21a of the baffle 21 which is mounted on the beam 31.

In the construction of the base frame 1 illustrated in FIG. 7 it is possible by removing one or more coating elements 34 to provide access to the ground region of the cabin-like cover from the exterior without having to remove panels 4 of the side walls for this purpose. In this way it is in particular possible for small components of the cabin-like cover to be installed and removed in a very simple manner.

Figure 8:
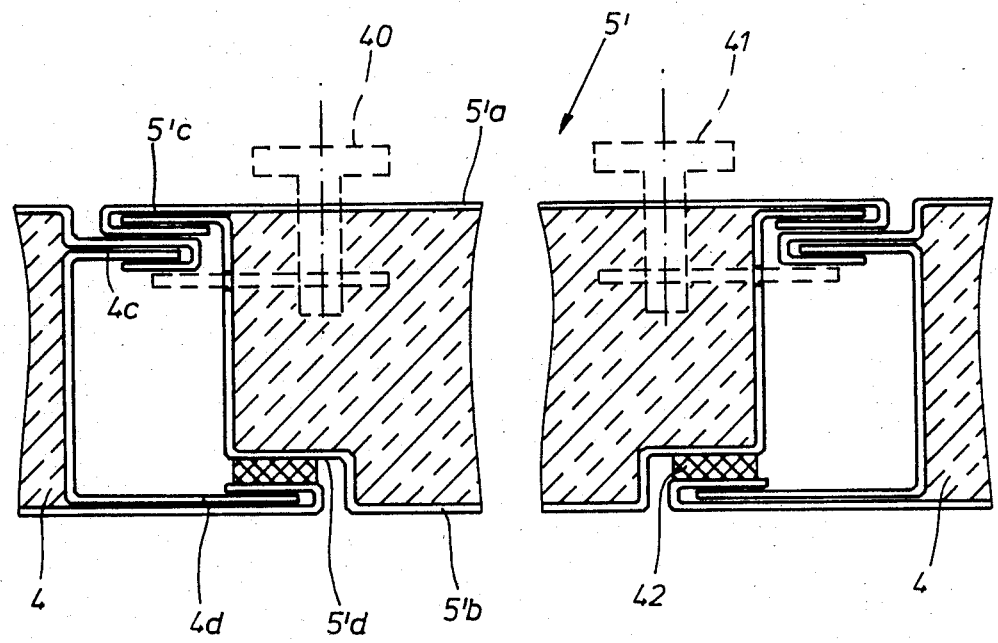
FIG. 8 shows a section through a further closure element.

FIG. 8 shows as a further embodiment a closure element 5' which in contrast to the embodiments described previously is constructed without a division. The closure element 5' has a cross-section which is graded in breadth and is broader on the outside of the cabin-like cover which is assumed to be on the top in FIG. 8 than on the inside. The outer skin 5'a and 5'b of the closure element 5' forms on the outside of the cabin-like cover a fold 5'c which rests on the corresponding fold 4c of the two adjacent panels in such a way that the outer surface of the closure element 5' is closed flush with the outer surface of the panel 4.

On the surface facing the inside of the cabin-like cover the closure element 5' is provided with a step 5'd which rests via a seal 42 on a fold 4d of the panels 4.

The closure element 5' is provided with swivelling connecting elements 40, 41—indicated by broken lines which—are accessible from the outside of the cabin-like cover and by means of which the closure element 5 can be locked with the two adjacent panels 4.

After swivelling of the connecting elements 40, 41 into the unlocked position the closure element 5' can be raised in the manner already described to such an extent that the engagement between the closure element 5' and the base frame 1 is released so that the closure element 5' can be detached from the base frame 1 and the top frame 2. Then one of the two adjacent panels 4 can be moved in the longitudinal direction of the side wall until the engagement between the side edges of this panel 4 and those of the next panel 4' (cf. FIG. 5) is released and the panel 4 which has been moved sideways can be raised and detached from the base frame and the top frame.

Within the scope of the invention "panels" should be understood to mean not only assembled wall elements of the construction described in the embodiments but also for example simple plates made from sheet metal or plastics material.

I claim:

1. A cabin-like cover assembly for covering machines and the like comprising
   (a) a horizontally extending base frame (1),
   (b) a horizontally extending top frame (2) positioned in alignment with and vertically above said base frame and including an inverted U-shaped cross section,
   (c) a plurality of self-supporting rectangular vertically extending panels (4) which form the side walls of the cabin-like cover, the upper edge portions of each of said panels engaging with said top frame (2), and the lower edge portions of each of said panels engaging with said base frame (1) and the side edges of at least some of said panels engaging with the side edges of the adjacent panels, characterised in that
   (d) said base frame (1) contains at least one horizontally extending base frame beam (31) of box-shaped cross-section,
   (e) said panels (4) each having their lower edges (13) formed in a U-shaped cross-section which faces downwardly and has two dependent legs that straddle and extend downwardly from a central section, said dependent legs defining an internal breadth (B) which is at least as great as the external breadth (B') of the base frame beam (31) and said central section engages and is supported upon the base frame beam with both legs of the U-shaped cross-section straddling over the base frame beam (31) and wherein the upper edge portion and the lower edge portion of the panels (4) have sufficient clearance (b,a) relative to the top frame (2) and the base frame (1) respectively for the panels to be raised and tilted and laterally removed from the frame; and
   (f) closure elements (5) positioned between some of the adjacent ones of said vertically extending panels with the outer surfaces of each of said closure elements being substantially flush with the outer surfaces of said adjacent ones of said vertically extending panels.

2. Cabin-like cover as claimed in claim 1, further characterised by
   (a) said closure elements (5) each being divided in a vertical plane (14) into two parts (15, 16 and 19, 20), and releasably connecting elements (17, 18) connecting said parts together into overlying relationship with respect to adjacent ones of said panels;
   (b) the breadth of the closure element (5) being of a dimension such that after removal of the closure element from said base frame and said top frame one of the panels (4) adjacent to the position previously occupied by the removed closure element can be moved in the longitudinal direction of the side wall until the engagement between the side edges of said one panel (4) and the next panel (4') is released.

3. Cabin-like cover as claimed in claim 2, characterised in that the upper edge and the lower edge of the panels (4) have sufficient clearance (a,b) relative to the top frame (2) and the base frame (1) respectively for the panels in the raised and tilted state to be detached from the base frame and the top frame.

4. Cabin-like cover as claimed in claim 1, characterised in that the panels (4) have complenetary side edges, and preferably one side edge of the panels (4) has a U-shaped cross-section and the other side edge has a plug-like cross-section.

5. Cabin-like cover as claimed in claim 1, characterised in that the two panels (4) adjacent to the closure element (5) have a plug-like cross-section on their side edges facing the closure element and the closure element closes flush with the broad sides of these panels.

6. Cabin-like cover as claimed in claim 1, characterised in that the closure elements (5) comprises two flat plates (19, 20) which are connected to one another by releasably connecting elements (17, 18).

7. Cabin-like cover as claimed in claim 1, characterised in that a baffle (21) which serves to deflect cooling agent and shavings is arranged on the inside of the base frame (1), said baffle being attached to and sloped downwardly from said base frame, said U-shaped cross-section of the lower edge of the panel (4) engages over the upper part (21a) of the baffle and the lower part (21b) thereof projects into the interior of the cover.

8. Cabin-like cover as claimed in claim 1, characterised in that the base frame (1) contains a beam (31) of box-shaped cross-section which is supported on the ground or the like by supports (12) which are adjustable in height.

9. Cabin-like cover as claimed in claim 1, characterised in that the base frame (1) consists of the following parts:
   (a) an upper beam (31) of box-shaped cross-section over which the U-shaped cross-section of the lower edge (13) of the panel engages,
   (b) a lower beam (32) which is arranged parallel to the upper beam (31) and spaced therefrom and is supported on the ground,
   (c) vertical connecting elements (33) between the two beams (31, 32),
   (d) releasable cover elements (34) which cover the free space between the two beams (31, 32) towards the exterior.

10. Cabin-like cover as claimed in claim 1, further characterised by
    (a) said closure element separates adjacent panels and is constructed in one piece, and connecting elements (40, 41) which are accessible from outside the cabin-like cover to panels (4) adjacent to the closure element (5') connecting said closure element to at least one side wall of the cover, so that after the connecting elements (40, 41) have been released the closure element (5') can be raised until the engagement between the closure element and the base frame (1) is released and the closure element can be detached from the base frame (1) and the top frame (2);

(b) the breadth of the closure element (5') being of a dimension such that after the closure element has been removed from said base frame and said top frame one of the two panels (4) adjacent to the position previously occupied by the removed closure element can be pushed in the logintudinal direction of the side wall until the engagement between the side edges of this panel (4) and those of the next panel (4') is released; and said one panel (4) which has been disengaged from the side edges of the next panel (4') can be raised until the engagement between this panel (4) and the base frame (1) is released and the panel can be detached from the base frame (1) and the top frame (2).

* * * * *